US011149377B2

(12) United States Patent
Lee et al.

(10) Patent No.: US 11,149,377 B2
(45) Date of Patent: Oct. 19, 2021

(54) CLOTHES TREATING APPARATUS

(71) Applicant: LG Electronics Inc., Seoul (KR)

(72) Inventors: Byungjin Lee, Seoul (KR); Yanghwan No, Seoul (KR); Inhee Han, Seoul (KR); Jonghwan Lee, Seoul (KR); Jihong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 168 days.

(21) Appl. No.: 16/068,162

(22) PCT Filed: Dec. 21, 2016

(86) PCT No.: PCT/KR2016/015017
§ 371 (c)(1),
(2) Date: Jul. 5, 2018

(87) PCT Pub. No.: WO2017/119641
PCT Pub. Date: Jul. 13, 2017

(65) Prior Publication Data
US 2019/0010655 A1  Jan. 10, 2019

(30) Foreign Application Priority Data
Jan. 5, 2016 (KR) .................. 10-2016-0000984

(51) Int. Cl.
*D06F 37/12* (2006.01)
*D06F 39/10* (2006.01)
(Continued)

(52) U.S. Cl.
CPC ............ *D06F 39/125* (2013.01); *D06F 37/12* (2013.01); *D06F 37/14* (2013.01); *D06F 37/24* (2013.01);
(Continued)

(58) Field of Classification Search
CPC ........ D06F 37/145; D06F 13/02; D06F 17/10; D06F 37/14; D06F 29/00
See application file for complete search history.

(56) References Cited

U.S. PATENT DOCUMENTS 1,999,353 A * 4/1935 Blake .................... D06F 37/145
68/154
2,982,120 A   5/1961 Pelensky
(Continued)

FOREIGN PATENT DOCUMENTS

EP     2949801      12/2015
GB      825148      12/1959
(Continued)

OTHER PUBLICATIONS

Extended European Search Report in European Application No. 16884024.7, dated Aug. 23, 2019, 14 pages.
(Continued)

*Primary Examiner* — Irina Graf
(74) *Attorney, Agent, or Firm* — Fish & Richardson P.C.

(57) ABSTRACT

A clothes treating apparatus includes a cabinet defining an entrance, a drawer configured to be drawn out from the cabinet through the entrance, a tub provided in the drawer, a circular drum bottom provided in the tub, a cylindrical drum body fixed to the drum bottom, a drum positioned on an upper surface of the drum body, a driving part including a rotating shaft that rotates the drum and penetrates the tub so as to be coupled to the drum bottom, a hub that is fixed to the center-of-rotation of the drum bottom and protrudes towards a drum inlet, and a stirring part including an arm extending from the hub towards a circumferential surface of the drum body.

20 Claims, 5 Drawing Sheets

(51) Int. Cl.
  *D06F 37/40* (2006.01)
  *D06F 37/14* (2006.01)
  *D06F 39/12* (2006.01)
  *D06F 39/08* (2006.01)
  *D06F 37/24* (2006.01)
  *D06F 29/00* (2006.01)
  *D06F 37/30* (2020.01)

(52) U.S. Cl.
  CPC .............. *D06F 37/40* (2013.01); *D06F 39/08* (2013.01); *D06F 37/245* (2013.01); *D06F 37/30* (2013.01); *D06F 39/10* (2013.01)

(56) References Cited

U.S. PATENT DOCUMENTS

| | | | |
|---|---|---|---|
| 3,481,164 A | | 12/1969 | Bochan et al. |
| 3,626,728 A | * | 12/1971 | Traube .................. D06F 37/145 68/18 F |
| 3,724,242 A | * | 4/1973 | Davis .................... D06F 39/024 68/17 A |
| 4,207,760 A | | 6/1980 | Bochan |
| 4,782,544 A | | 11/1988 | Nystuen et al. |
| 5,033,277 A | | 7/1991 | Khan |
| 7,506,525 B2 | * | 3/2009 | La Belle ................ D06F 13/02 68/131 |
| D667,179 S | * | 9/2012 | Jeon ................................. D32/6 |
| D773,103 S | * | 11/2016 | Recker ........................... D26/89 |
| 2003/0200774 A1 | * | 10/2003 | Kim ....................... D06F 17/06 68/133 |
| 2009/0139275 A1 | * | 6/2009 | Kim ........................ D06F 25/00 68/27 |
| 2009/0145174 A1 | | 6/2009 | Kim et al. |
| 2010/0294004 A1 | * | 11/2010 | Hu .......................... D06F 39/12 68/13 R |
| 2014/0165662 A1 | | 6/2014 | Ramasco et al. |
| 2014/0283563 A1 | | 9/2014 | Hong et al. |
| 2016/0040344 A1 | * | 2/2016 | Li ......................... D06F 37/264 8/137 |

FOREIGN PATENT DOCUMENTS

| | | |
|---|---|---|
| GB | 1100180 | 1/1968 |
| KR | 10-0335053 | 5/2002 |
| KR | 10-2011-0121091 | 11/2011 |
| KR | 10-1306723 | 9/2013 |
| KR | 10-2014-0014440 | 2/2014 |

OTHER PUBLICATIONS

Partial Supplementary European Search Report in European Application No. 16884024.7, dated May 28, 2019, 15 pages.
Australian Examination Report in Australian Appln. No. 2016385317, dated Jan. 9, 2019, 5 pages.

* cited by examiner

[FIG 1]
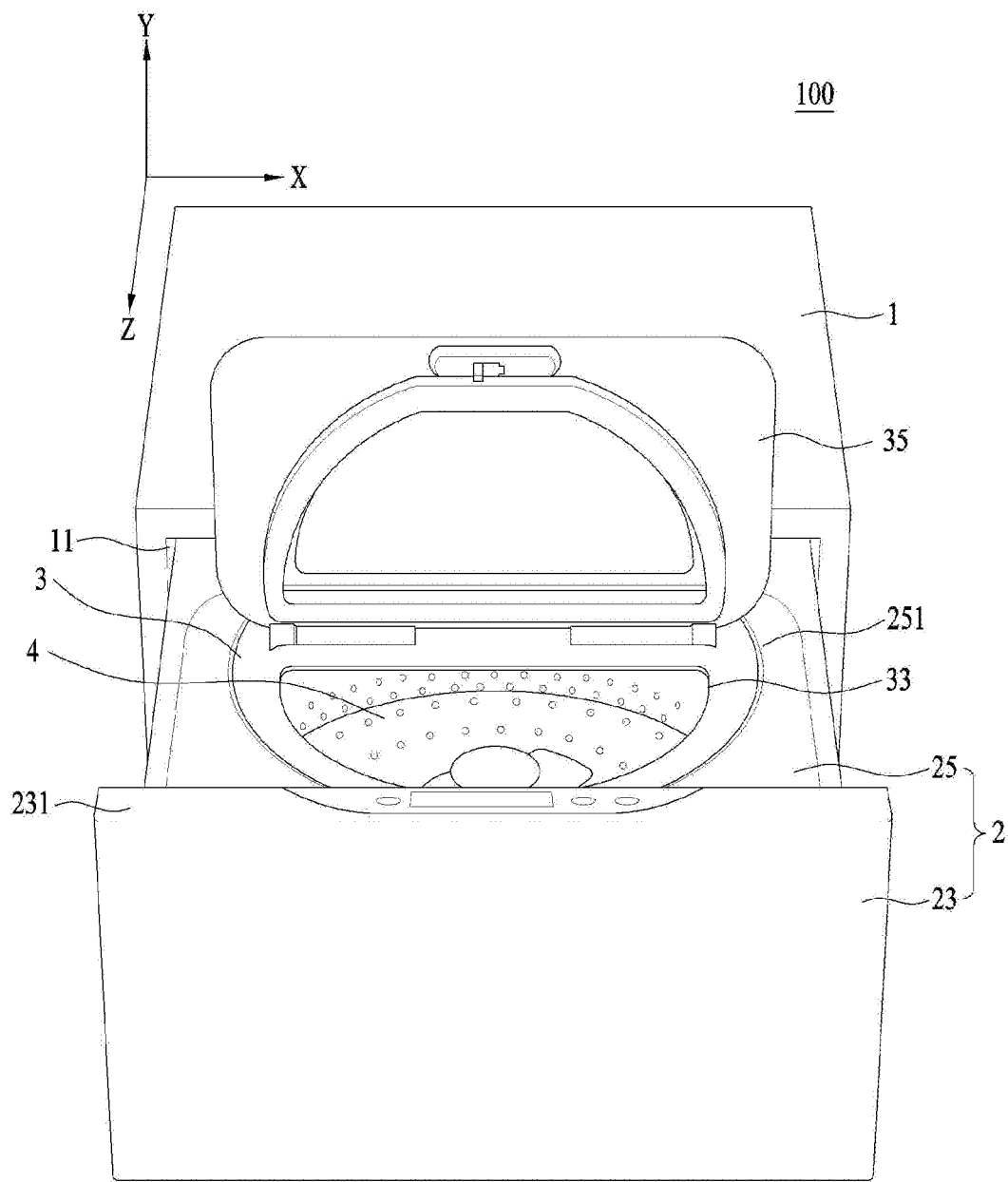

[FIG 2]
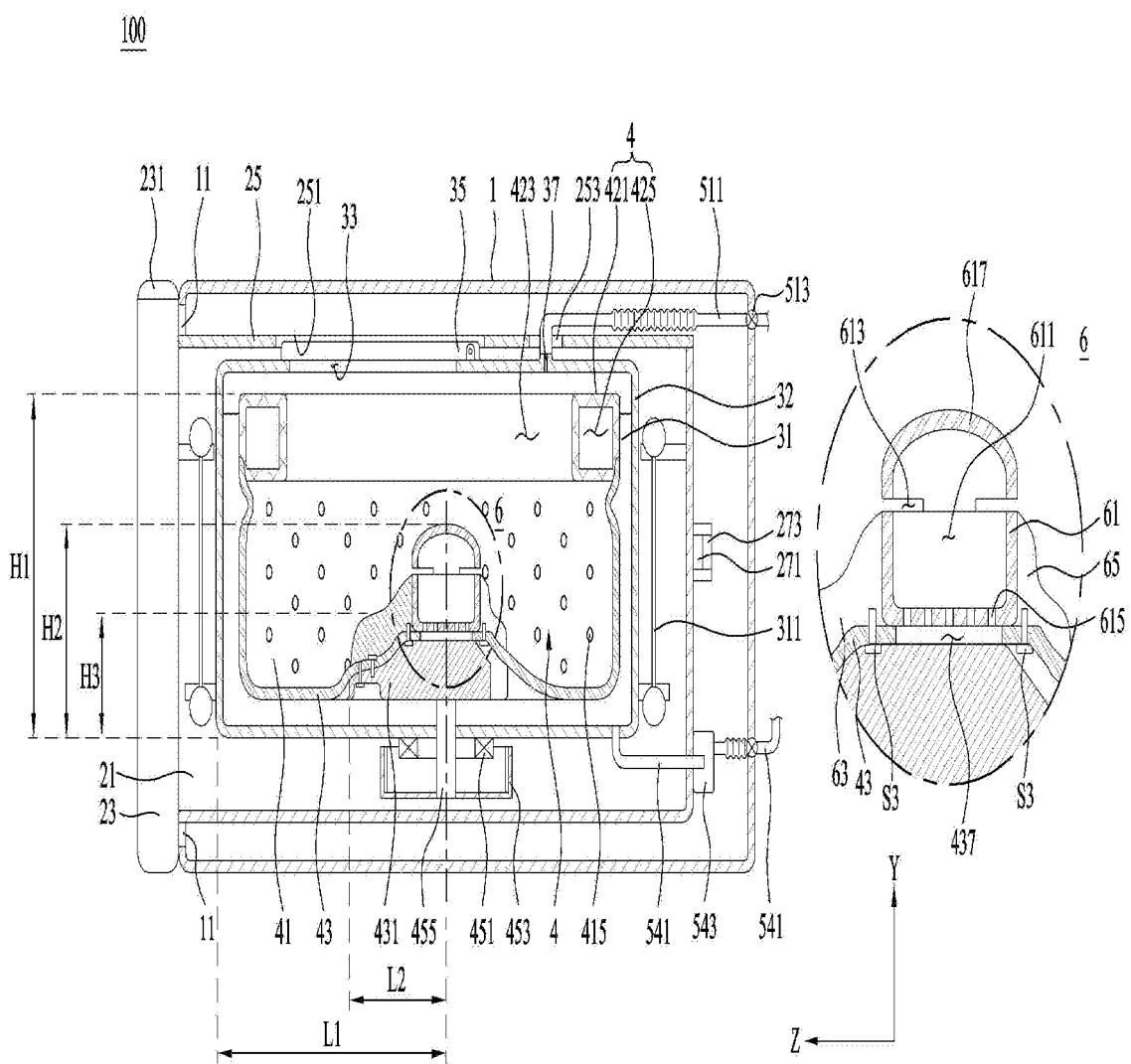

[FIG 3]
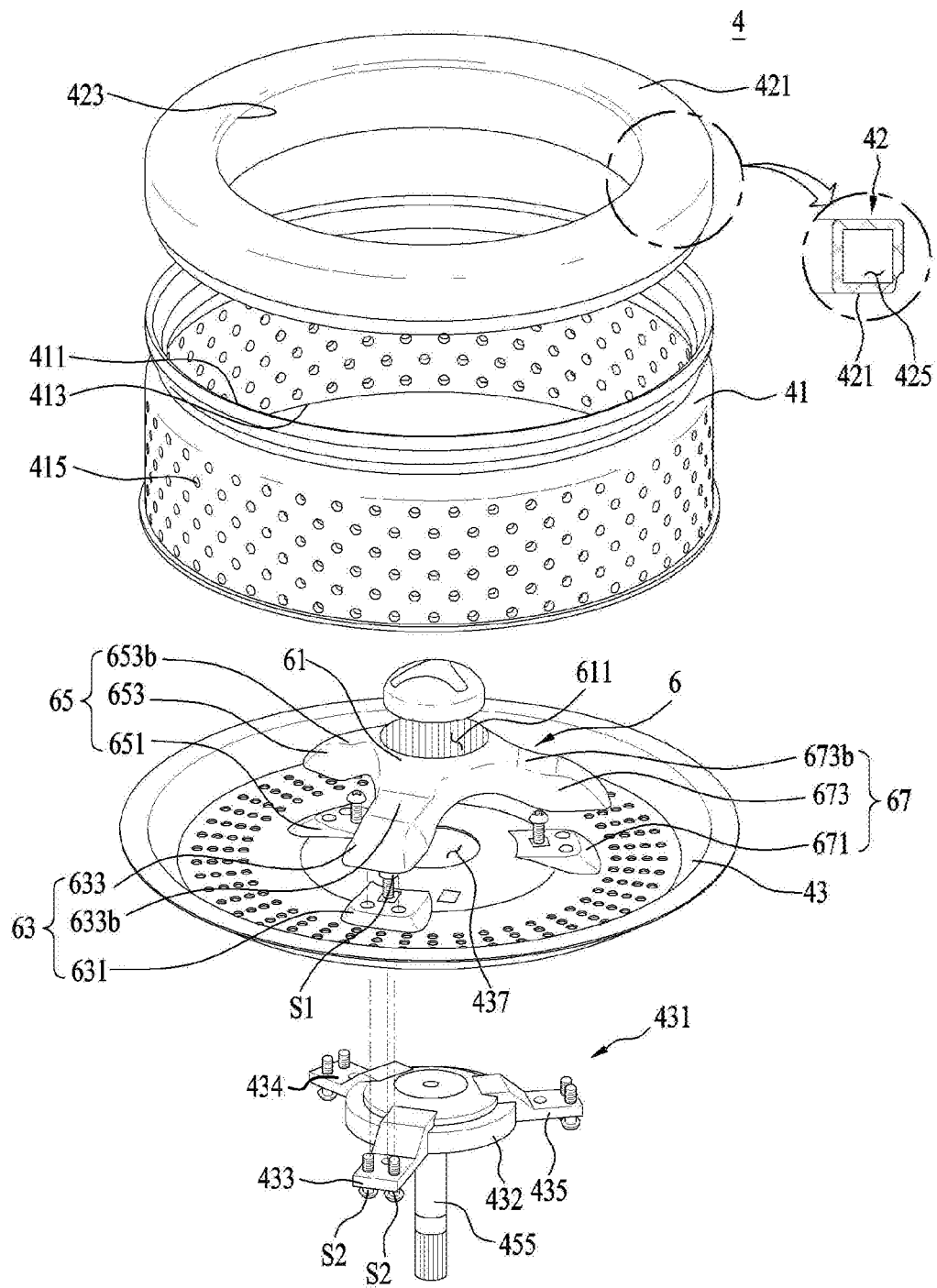

[FIG 4]
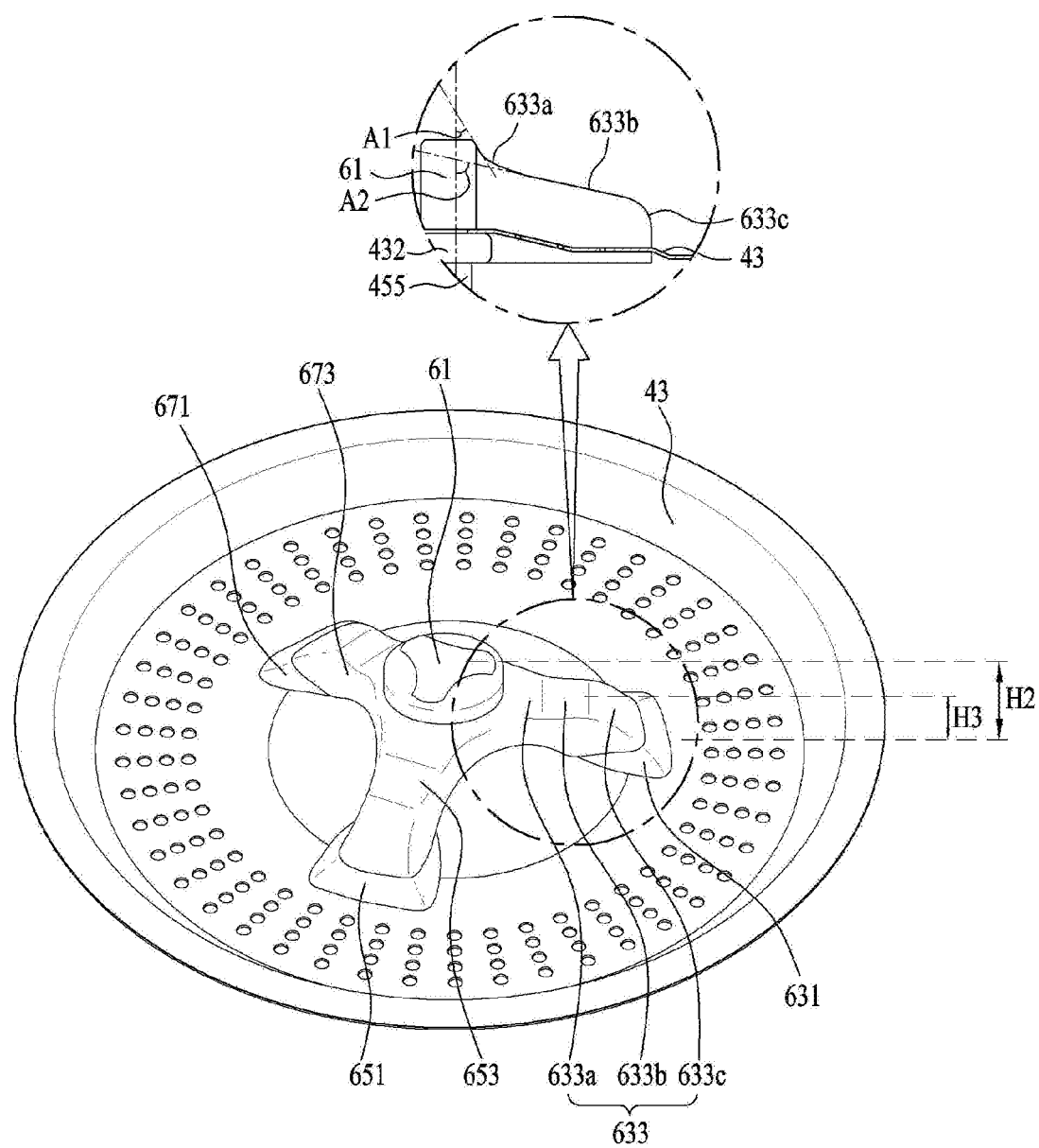

【FIG 5】
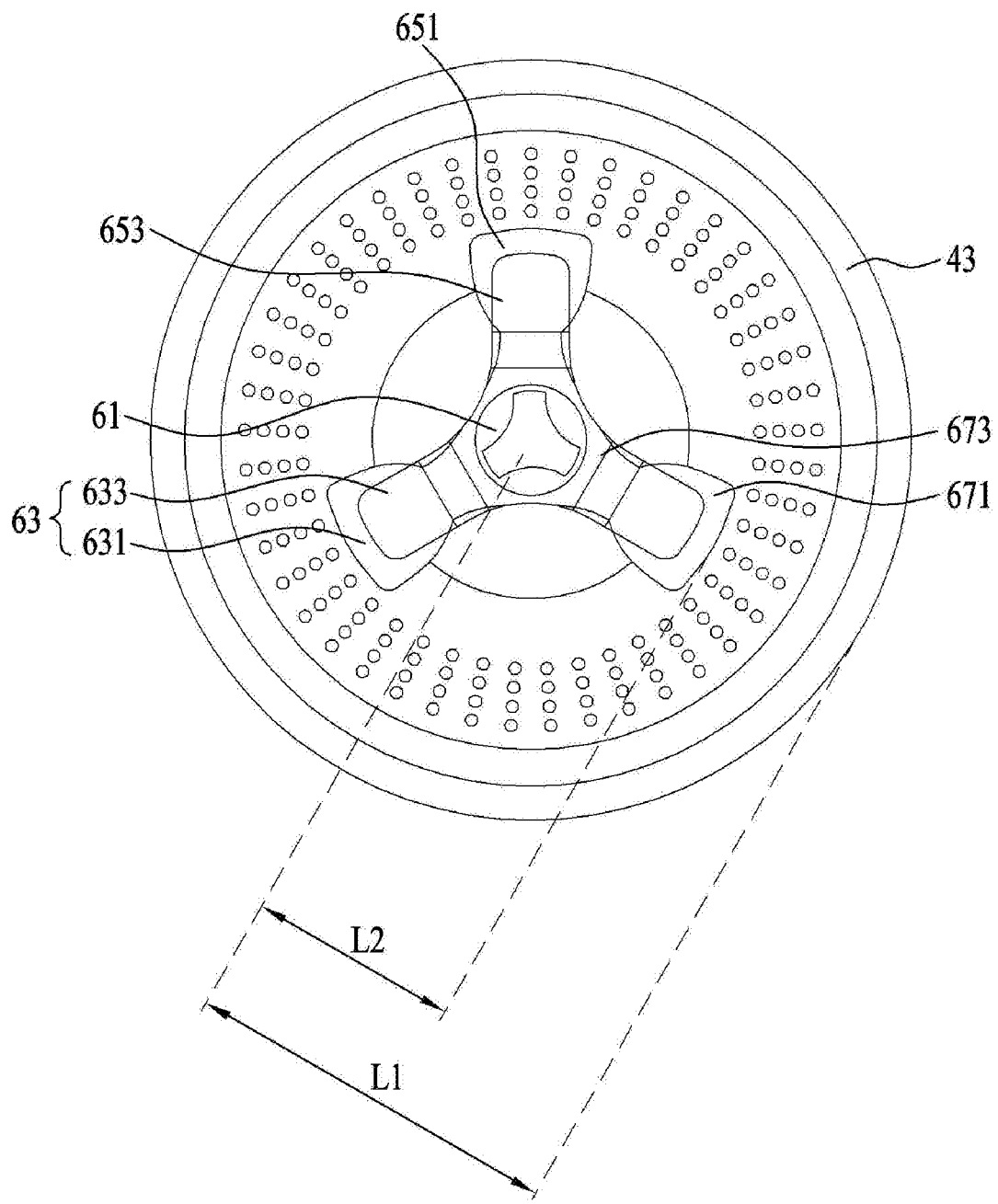

CLOTHES TREATING APPARATUS

CROSS-REFERENCE TO RELATED APPLICATIONS

This application is a National Stage application under 35 U.S.C. § 371 of International Application No. PCT/KR2016/015017, filed on Dec. 21, 2016, which claims the benefit of Korean Application No. 10-2016-0000984, filed on Jan. 5, 2016. The disclosures of the prior applications are incorporated by reference in their entirety.

TECHNICAL FIELD

The present invention relates to a laundry treatment apparatus.

BACKGROUND ART

Generally, laundry treatment apparatuses include an apparatus that washes laundry (an object to be washed or an object to be dried), an apparatus that dries laundry, and an apparatus that is capable of performing both washing and drying of laundry.

Among conventional laundry treatment apparatuses, there is one including a cabinet, a drawer removably provided in the cabinet, and a laundry accommodation unit provided in the drawer to provide a laundry accommodation region (a laundry treatment space) for washing or drying laundry.

The laundry treatment apparatus, in which the laundry accommodation unit is provided in the drawer, which is removably provided in the cabinet, may store therein a greater amount of water and laundry when the volume of the laundry accommodation unit is greater, and thus may achieve enhanced washing ability.

In the laundry treatment apparatus including the drawer, however, it is necessary to limit the height of the laundry treatment apparatus or to minimize the volume of the laundry treatment apparatus, in consideration of the space utilization thereof or for use as an auxiliary laundry treatment apparatus.

In the conventional laundry treatment apparatus including the laundry accommodation unit provided in the drawer, therefore, minimizing the volume of the laundry accommodation unit while enhancing washing ability is a very important design factor.

In addition, minimizing damage to laundry while enhancing washing ability is another very important design factor.

DISCLOSURE

Technical Problem

One object of the present invention devised to solve the problem lies in a laundry treatment apparatus including a laundry accommodation unit provided in a drawer removably provided in a cabinet, wherein the volume of the laundry treatment apparatus is minimized while the washing ability of the laundry treatment apparatus is enhanced.

Another object of the present invention devised to solve the problem lies in a laundry treatment apparatus capable of effectively agitating laundry or sufficiently forming a stream of water during the rotation of a drum.

Another object of the present invention devised to solve the problem lies in a laundry treatment apparatus capable of minimizing damage to laundry.

A further object of the present invention devised to solve the problem lies in a laundry treatment apparatus capable of filtering water supplied into a laundry accommodation unit while laundry is washed.

Technical Solution

The present invention provides a laundry treatment apparatus including a cabinet having an entrance, a drawer provided in the cabinet so as to be removable from the cabinet through the entrance, a tub provided in the drawer to store water, the tub having a tub opening, through which laundry is introduced into or removed from the tub, a drum including a circular drum bottom surface provided in the tub, a cylindrical drum body fixed to the drum bottom surface and extending toward the tub opening, and a drum opening located in the upper surface of the drum body so as to communicate with the tub opening, a driving unit to rotate the drum, the driving unit having a rotary shaft connected to the drum bottom surface through the tub, and an agitator including a hub fixed to the center of rotation of the drum bottom surface so as to protrude toward the drum opening and an arm extending from the tub toward the circumferential surface of the drum body.

The agitator may have a height equal to or greater than half of the height of the drum.

The arm may include a first surface extending from the hub and inclined toward the drum bottom surface, a second surface having an angle of inclination greater than an angle of inclination of the first surface based on the rotary shaft, and a third surface that interconnects the drum bottom surface and the second surface, and the height from the drum bottom surface to the hub may be equal to or greater than half of the height of the drum while the height from the drum bottom surface to the second surface is less than half of the height of the drum.

The end of the arm may be spaced apart from the circumferential surface of the drum by a predetermined distance.

The distance from the hub to the end of the arm may be greater than half of the radius of the drum body.

The arm may include an arm base provided at the drum bottom surface and an arm body having one end fixed to the hub and the other end fixed to the arm base.

The arm base may be made of the same material as the drum bottom surface, and the arm body may be made of a different material than the drum bottom surface.

The arm base may be formed by bending the drum bottom surface toward the drum opening.

The arm may include a first arm, a second arm, and a third arm provided around the hub so as to be spaced apart from each other by 120 degrees.

The laundry treatment apparatus may further include a body located outside the drum bottom surface, the rotary shaft being coupled to the body, a fixing arm extending from the body toward the circumferential surface of the drum bottom surface, the fixing arm being provided at a position corresponding to the arm, and a first fastening unit fixed to the fixing arm through the drum bottom surface, the first fastening unit being located in a laundry storage space defined by the drum so as not to be exposed by the arm.

The arm may include an arm base provided at the drum bottom surface and an arm body having one end fixed to the hub and the other end fixed to the arm base, and the first fastening unit may be fixed to the fixing arm through the arm base, the first fastening unit not being exposed by the arm body.

The laundry treatment apparatus may further include a second fastening unit inserted into the drum from the outside of the drum bottom surface, the second fastening unit being fixed to the arm body through the fixing arm and the drum bottom surface.

The laundry treatment apparatus may further include a third fastening unit inserted into the drum from the outside of the drum bottom surface, the third fastening unit being fixed to the hub through the drum bottom surface.

The laundry treatment apparatus may further include a chamber provided in the hub, an introduction hole, through which the inside of the chamber communicates with the inside of the drum and through which water is introduced into the chamber, a filtering hole formed through the bottom surface of the chamber, and a drum through-hole formed through the drum bottom surface, the drum through-hole being located under the filtering hole.

Advantageous Effects

The present invention has the effect of providing a laundry treatment apparatus including a laundry accommodation unit provided in a drawer that is removably provided in the cabinet so as to be removable from the cabinet through the entrance, wherein the volume of the laundry treatment apparatus is minimized while the washing ability of the laundry treatment apparatus is enhanced.

In addition, the present invention has the effect of providing a laundry treatment apparatus capable of filtering water supplied into a laundry accommodation unit while laundry is washed.

DESCRIPTION OF DRAWINGS

FIGS. 1 and 2 show an example of a laundry treatment apparatus according to the present invention;

FIG. 3 shows an example of an agitator and a drum of the present invention; and

FIGS. 4 and 5 show the example of the agitator of the present invention.

BEST MODE

Reference will now be made in detail to the exemplary embodiments of the present invention, examples of which are shown in the accompanying drawings. Meanwhile, the configuration of an apparatus or a control method thereof, which will be given below, is merely intended to explain exemplary embodiments of the present invention, rather than limiting the technical scope of the present invention. Throughout the specification, the same reference numerals denote the same constituent elements.

As shown in FIG. 1, a laundry treatment apparatus 100 according to the present invention includes a cabinet 1, a drawer removably provided in the cabinet 1, and a laundry accommodation unit 3 and 4 provided in the drawer to provide a laundry treatment space.

The cabinet 1 may have an entrance 11, and the drawer 2 may be removed from or inserted into the cabinet 1 through the entrance 11. The cabinet 1 may have a longer length in the width direction (X-axis direction) than in the height direction (Y-axis direction) (i.e. the drawer may have a longer length in the width direction than in the height direction).

As shown in FIG. 2, the drawer 2 includes a drawer body 21 having an open upper surface and a drawer cover 25 provided in the open surface of the drawer body. That is, the drawer body 21 may have a hollow hexahedral shape, and the drawer cover 25 may be fixed to the drawer body 21 so as to form the upper surface of the drawer body 21.

The drawer body 21 may be removed from or inserted into the cabinet 1 via a slider. The slider may include a slider body 271, which is fixed to one of the cabinet 1 and the drawer body 21, and a slider housing 273, which is fixed to the other of the cabinet and the drawer body to define the movement path of the slider body 271.

A drawer panel 23 is provided on the front surface of the drawer body 21. The drawer panel 23 serves to open and close the entrance 11 in the cabinet.

The drawer panel 23 may be provided with a control panel 231, which controls the operation of the laundry treatment apparatus 100. The control panel 231 includes means (a controller of the laundry treatment apparatus) for controlling, for example, means (a water supply unit and a drainage unit) for supplying water to the laundry accommodation unit 3 and 4 and discharging the water therefrom, means (a driving unit) for rotating laundry, and means (a hot air supply unit and a moisture supply unit) for supplying steam or hot air to laundry.

In addition, the control panel 231 may include an input unit (not shown), which allows a user to input a control command to the laundry treatment apparatus 100, and a display unit (not shown) (means for displaying information on the operation of the laundry treatment apparatus), which allows the user to check the control command input via the input unit or which notifies the user of the process of executing the control command input by the user.

The drawer cover 25 may be provided with a first cover through-hole 251 and a second cover through-hole 253, which are formed through the drawer cover 25 for communication of the inside of the drawer body 21 with the outside.

The laundry accommodation unit 3 and 4, provided in the drawer 2, may include a tub 3, which is provided in the drawer body 21 to provide the space in which water is stored, and a drum 4, which is rotatably provided in the tub to store laundry therein.

The tub 3 may include a tub body 31, which is fixed inside the drawer 2 via a tub support unit 311, and a tub cover 32, which defines the upper surface of the tub body.

The tub cover 32 is provided with a tub opening 33 for communication of the inner space of the tub body 31 with the outside of the tub. The tub opening 33 is opened and closed by a door 35.

The door 35 is rotatably provided on the tub cover 32 (and is configured to open and close a portion of the tub cover). The door 35 may be rotated to the outside of the drawer 2 through the first cover through-hole 251, which is formed in the drawer cover 25. Thus, the user may introduce laundry into the tub 3 by opening the door 35 after removing the drawer 2 from the cabinet 1.

The reason that the laundry accommodation unit is constituted by the tub 3 and the drum 4 is to enable the laundry treatment apparatus 100 according to the present invention to perform a washing function. In order to enable the laundry treatment apparatus 100 to further perform a laundry-drying function, therefore, a hot air supply unit (not shown) may be further provided in the cabinet 1 to supply hot air to the tub 3.

The hot air supply unit (not shown), provided in the laundry treatment apparatus 100, may include a circulation duct configured to circulate the air in the tub 3 and a heat exchanger provided in the circulation duct for dehumidification and heating of the air discharged from the first tub.

Alternatively, the hot air supply unit (not shown), provided in the laundry treatment apparatus, may include a discharge duct, which discharges the air in the tub to the outside of the cabinet 1, a supply duct, which supplies the air outside the tub into the tub 3, and a heat exchanger, which heats the air introduced into the supply duct.

In the case in which the laundry treatment apparatus 100 according to the present invention is configured to perform a laundry-washing function, the laundry treatment apparatus 100 further requires a water supply unit and a drainage unit.

As shown in FIG. 2, the water supply unit may include a water supply pipe 511, which interconnects a water source located outside the cabinet 1 and a water supply hole 37, and a valve 513, which opens and closes the water supply pipe 511 under the control of a controller (not shown).

The water supply pipe 511 extends through the drawer cover 25 via the second cover through-hole 253. The water supply pipe may have a flexible structure, or may be formed of an elastic material in consideration of the movement range of the drawer.

The drainage unit serves to discharge the water stored in the tub 3 to the outside of the cabinet 1. The drainage unit may include a drainage pipe 541, which guides the water in the tub 3 to the outside of the cabinet 1, and a pump 543, which is provided in the drainage pipe 541 to discharge the water from the tub 3. The drainage pipe may have a flexible structure, or may be formed of an elastic material.

Meanwhile, the water supply hole 37, through which water is introduced into the tub body 31, is provided in the tub cover 32. One end of the water supply pipe 511 is fixed to the water supply hole 37.

Meanwhile, the drum 4 may be rotated in the tub 3 by a driving unit. As shown in FIG. 2, the driving unit may include a stator 451, which is fixed to the tub 3 and generates a rotating field, a rotor 453, which is rotated by the rotating field, and a rotary shaft 455, which extends through the tub 3 to interconnect a drum bottom surface and the rotor 453.

The rotary shaft 455 may be perpendicular to the ground.

As shown in FIG. 3, the drum 4 includes a cylindrical drum body 41 having an open lower surface 413, a drum bottom surface 43 fixed to the drum body 41 to close the open lower surface 413, and a drum opening located in the upper surface of the drum body 41 so as to communicate with the tub opening 33.

The drum opening may be constituted by an open surface 411 formed in the upper part of the drum body. In the case in which a balancer 42 is provided in the open upper surface 411 of the drum body, however, the drum opening may be constituted by a through-hole 423 provided in the balancer 42.

That is, the balancer 42 may include a housing 421 fixed to the open upper surface 411, a through-hole 423 (a housing through-hole) provided in the inner circumferential surface of the housing so as to be formed through the housing, and a flow-path 425 provided in the housing such that a fluid or a ball can circulate through the flow-path. In this case, the through-hole 423 may constitute the drum opening.

Only one of the ball and the fluid may be provided in the flow-path 425, or both the ball and the fluid may be provided in the flow-path 425. When the drum 4 is eccentrically rotated, the balancer 42 moves in the direction opposite the force of the fluid or the ball causing eccentricity in the flow-path 425 (centrifugal force applied to the laundry in the drum) to reduce the eccentric rotation of the drum (the vibration of the drum).

Meanwhile, the drum body 41 is provided with a plurality of communication holes 415, through which the inside of the drum body communicates with the outside. Consequently, the water stored in the tub body 31 may move into the drum body 41 through the communication holes 415, and the water in the drum body 41 may move into the tub body 31 through the communication holes 415.

Meanwhile, a shaft-fixing unit 431 may be provided at the drum bottom surface 43 for easy coupling between the rotary shaft 455 and the drum bottom surface 43.

The shaft-fixing unit 431 may include a body 432 located outside the space defined by the drum 4 (the laundry storage space) and fixing arms 433, 434, and 435 extending from the body toward the edge of the drum bottom surface 43.

It is necessary for at least one of the body 432 or the fixing arms 433, 434, and 435 to be fixed to the drum bottom surface 43. The figure shows the case in which the fixing arms 433, 434, and 435 are fixed to the drum bottom surface 43 by way of example.

The rotary shaft 455 may be fixed to the body 432, and the fixing arms may include a first fixing arm 433, a second fixing arm 434, and a third fixing arm 435, which are provided around the rotary shaft so as to be spaced apart from each other by 120 degrees.

Meanwhile, in the case in which the laundry treatment apparatus having the above structure is used as an auxiliary laundry treatment apparatus, it is necessary to minimize the volume of the laundry treatment apparatus in consideration of spatial utilization thereof.

In order to minimize the volume of the laundry treatment apparatus 100, it is necessary to minimize the volume of the laundry accommodation unit 3 and 4. If the volume of the laundry accommodation unit 3 and 4 is reduced, however, the amount of water that may be stored in the tub 3 is reduced, which may deteriorate washing performance.

In order to solve the above problem, the laundry treatment apparatus 100 according to the present invention may further include an agitator 6.

As shown in FIG. 3, the agitator 6 may include a hub 61 fixed to the center of rotation of the drum bottom surface 43 (corresponding to the center of rotation or the rotary shaft of the drum) and arms 63, 65, and 67 extending from the hub toward the circumferential surface of the drum body 41.

The hub 61 may protrude from the drum bottom surface 43 toward the drum opening 423, and the arms may include a first arm 63, a second arm 65, and a third arm 67, which are provided around the hub 61 so as to be spaced apart from each other by 120 degrees.

Experimental results reveal that, when the height of the hub 61 is increased, as long as the hub does not protrude out of the drum, washing ability is also enhanced. The reason for this is that, in the case in which the laundry treatment apparatus is configured such that the hub 61 is located at the center of rotation of the drum and the arms 63, 65, and 67 radially protrude from the hub 61, laundry can be moved to the edge of the drum by the hub 61 and the laundry can be uniformly distributed in the drum by the arms.

Consequently, the hub 61 may be configured to have a height H2 that is greater than half of the height H1 of the drum (see FIG. 2).

As shown in FIG. 3, the first arm 63 may include a first arm base 631 provided at the drum bottom surface 43 and a first arm body 633 having one end fixed to the hub 61 and the other end fixed to the first arm base 631.

As shown in FIG. 4, the first arm body 633 may include a first surface 633*a* extending from the hub 61 toward the drum bottom surface 43, a second surface 633*b* having an angle of inclination A2 greater than an angle of inclination A1 of the first surface based on the rotary shaft 455, and a third surface 633c that interconnects the drum bottom surface 43 and the second surface.

In the case in which the first arm 63 is constituted by the first arm base 631 and the first arm body 633, the third surface 633c may be formed as the result of combining the surface formed at the first arm base and the surface provided at the first arm body 633.

In any case, the height H3 from the drum bottom surface 43 to the second surface 633b may be less than half of the height H1 (see FIG. 2) of the drum.

If the height of the first arm 63 is equal to the height H2 of the hub 61, laundry may be caught in the spaces defined between the arms. As a result, the laundry may not move in the drum 4, which may reduce washing ability.

Consequently, the height H3 of the second surface 633b is set to be lower than the height H2 of the hub such that, even when laundry is located in the spaces defined between the arms, the laundry can move to an adjacent space over the second surface during the rotation of the drum 4.

The second arm 65 and the third arm 67 may have the same structure as the first arm 63.

That is, the second arm 65 may include a second arm base 651 provided at the drum bottom surface 43 and a second arm body 653 having one end fixed to the hub 61 and the other end fixed to the second arm base 651, and the third arm 67 may include a third arm base 671 provided at the drum bottom surface 43 and a third arm body 673 having one end fixed to the hub 61 and the other end fixed to the third arm base 671.

Each of the second arm 653 and the third arm body 673 also includes a first surface extending from the hub 61 toward the drum bottom surface 43, a third surface extending from the drum bottom surface 43 toward the hub 61, and a second surface 653b or 673b (see FIG. 3), which interconnects the first surface and the third surface and is configured to have an angle of inclination greater than an angle of inclination of the first surface based on the rotary shaft 455.

In this case, the height of the second surface 653b, provided at the second arm body, and the height of the third surface 673b, provided at the third arm body, may be configured to be equal to the height of the second surface 633b, provided at the first arm body.

Meanwhile, as shown in FIG. 5, it is necessary for the end of each of the arms 63, 65, and 67 not to contact the circumferential surface of the drum body 41. If the end of each arm extends to the drum body 41 and thus contacts the drum body 41, laundry may be caught in the spaces defined between the arms 63, 65, and 67.

If the laundry is caught in the spaces defined by the arms and the drum body, the laundry may not move in the drum even though the drum 4 is rotated, which may reduce washing ability.

In the case in which the end of each of the arms 63, 65, and 67 is provided so as not to contact the circumferential surface of the drum body 41, however, the laundry can move to an adjacent space through the space defined between the end of each of the arms 63, 65, and 67 and the circumferential surface of the drum body 41 when the drum 4 is rotated, even though the laundry is located in the spaces defined between the arms, which may prevent the above problem from occurring.

To this end, the end of the first arm 63, the end of the second arm 65, the end of the third arm 67 may be spaced apart from the drum body 41 by a predetermined distance. That is, the distance L2 from the hub 61 to the end of each of the arms 63, 65, and 67 may be smaller than the radius L1 of the drum body (the radius of the drum bottom surface). Experimental results reveal that, when the distance L2 to the end of each of the arms 63, 65, and 67 is longer than half of the radius L1 of the drum body (the radius of the drum bottom surface), washing ability is enhanced.

Meanwhile, in the case in which each of the hub 61 and the arms 63, 65, and 67 has the above height or length, it may be difficult to form the drum bottom surface 43 such that the agitator 6 is integrally formed with the drum bottom surface 43.

Generally, the drum 4, in which laundry is stored, is made of a rustproof metal (e.g. stainless steel), since the drum contacts the water stored in the tub 3. In the case in which the agitator 6 having the above height or length is formed using a method of forming the drum bottom surface 43 through plastic deformation (e.g. pressing), however, the drum bottom surface 43 may be broken, since the shape of the agitator 6 exceeds the limitations of elongation percentage or ductility (the characteristics of a material in which the material stretches as the result of deformation of the material when tensile force is applied to the material) of the metal. Consequently, the agitator 6 of the present invention may be provided separately from the drum bottom surface 43 so as to be coupled to the drum bottom surface 43.

To this end, as shown in FIG. 3, each of the arm bases 631, 651, and 671 may be formed by bending the drum bottom surface 43 toward the drum opening 423, the arm bodies 633, 653, and 673 may extend from the hub 61 toward the arm bases 631, 651, and 671, respectively, and the ends of the arm bodies may be fixed to the arm bases 631, 651, and 671, respectively.

The arm bases 631, 651, and 671 may fix the arms 63, 65, and 67, provided at the agitator 6, respectively. In this case, the arm bases 631, 651, and 671 may be configured such that the drum bottom surface 43 protrudes toward the drum opening 423 in order to improve the function of the arms 63, 65, and 67 (agitation of the drum).

In this case, the arm bases 631, 651, and 671 may be made of the same material as the drum bottom surface 43, but the arm bodies 633, 653, and 673 may be made of a different material than the drum bottom surface 43 (the arm bodies and the hub may be made of the same material).

Meanwhile, the shaft-fixing unit 431 and the drum bottom surface 43 may be coupled to each other, and the agitator 6 and the drum bottom surface 43 may be coupled to each other, for example, as shown in FIG. 3.

That is, the shaft-fixing unit 431 may be fixed to the drum bottom surface 43 via a first fastening unit S1 extending through the arm bases 631, 651, and 671 and then fixed to the fixing arms 433, 434, and 435.

Since the first fastening unit S1 is located in the laundry storage space defined by the drum 4, the laundry in the drum 4 may be damaged by the first fastening unit S1 if the first fastening unit S1 is exposed outside. For this reason, the first fastening unit S1 may be located between the arm bodies 633, 653, and 673 and the arm bases 631, 651, and 671 such that the first fastening unit S1 is not exposed outside the arm bodies when the arm bodies 633, 653, and 673 are coupled to the arm bases 631, 651, and 671, respectively.

Meanwhile, the agitator 6 may be fixed to the drum bottom surface 43 via a second fastening unit S2, which extends through the fixing arms 433, 434, and 435 and the drum bottom surface 43 and is then fixed to the arm bodies 633, 653, and 673.

That is, the second fastening unit S2 is inserted into the laundry storage space, defined by the drum 4, from outside the laundry storage space in order to fix the agitator 6 to the drum bottom surface 43.

Furthermore, the laundry treatment apparatus according to the present invention may further include a third fastening unit S3 inserted into the drum from the outside of the laundry storage space in order to fix the hub 61 to the drum bottom surface 43 (see FIG. 2).

As shown in FIG. 2, the third fastening unit S3 is fixed to the hub 61 through the drum bottom surface 43. As a result, it is possible to prevent the bottom surface of the hub 61 and the drum bottom surface 43 from being spaced apart from each other and thus to prevent foreign matter from being introduced into the gap between the hub 61 and the drum bottom surface 43.

The hub 61 may be further provided with a filter, which filters the water in the tub 3. The filter may include a chamber 611 provided in the hub 61, an introduction hole 613, through which water is introduced into the chamber, and a filtering hole 615, through which the water is discharged from the chamber.

The filtering hole 615 may include a plurality of holes formed through the bottom surface of the chamber 611. In this case, the drum bottom surface may be further provided with a drum through-hole 437, through which the water discharged through the filtering hole 615 is discharged to the tub body 31.

When the water in the tub 3 moves as the result of rotating the drum, therefore, some of the water in the drum 4 is introduced into the chamber 611 through the introduction hole 613, and the water in the chamber is discharged to the tub 3 through the filtering hole 615 and the drum through-hole 437. At this time, foreign matter contained in the water may remain in the chamber 611 due to the filtering hole 615.

In order to remove the foreign matter remaining in the chamber 611, the chamber may be provided at the upper surface thereof with a chamber cover 617, which may be detachably attached to the chamber 611. In the case in which the chamber cover 617 is provided, the introduction hole 613 may be provided in the space defined between the lower end of the chamber cover 617 and the upper end of the chamber 611.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A laundry treatment apparatus comprising:
a cabinet that defines an opening, wherein a width of the cabinet is greater than a height of the cabinet;
a tub located in the cabinet and configured to receive water, the tub defining a tub opening that allows introduction of laundry to the tub and removal of laundry from the tub;
a drum located in the tub and configured to rotate relative to the tub, the drum comprising:
a drum bottom that has a circular shape, and
a drum body that has a cylindrical shape, that is coupled to the drum bottom, and that extends toward the tub opening, the drum body defining a drum opening at an upper surface of the drum body that communicates with the tub opening;
a driving unit configured to cause rotation of the drum relative to the tub, the driving unit comprising a rotary shaft connected to the drum bottom through the tub;
an agitator comprising:
a hub located at a position corresponding to a center of rotation of the drum, the hub protruding toward the drum opening, and
an arm that extends from the hub toward a circumferential surface of the drum body; and
a shaft-fixing unit connected to the rotary shaft, the shaft-fixing unit being located below the drum bottom and coupled to the drum bottom,
wherein the shaft-fixing unit is fixed to the drum bottom by a first fastening unit, and the agitator is fixed to the drum bottom by a second fastening unit separate from the first fastening unit,
wherein a height of the hub is greater than or equal to a half of a height of the drum, and a height of the arm is less than the half of the height of the drum, and
wherein a width of the drum is greater than the height of the drum.

2. The laundry treatment apparatus according to claim 1, wherein the first fastening unit penetrates a portion of the arm and the drum bottom, the first fastening unit penetrating the drum bottom in a direction from an inside of the drum toward an outside of the drum and being coupled to the shaft-fixing unit, and
wherein the second fastening unit penetrates the shaft-fixing unit and the drum bottom, the second fastening unit penetrating the drum bottom in a direction from the outside of the drum toward the inside of the drum and being coupled to the agitator.

3. The laundry treatment apparatus according to claim 2, wherein the arm comprises:
a first surface that extends from the hub and that is inclined toward the drum bottom, the first surface defining a first inclination angle with respect to the rotary shaft;
a second surface that extends from the first surface and that defines a second inclination angle with respect to the rotary shaft, the second inclination angle being greater than the first inclination angle with respect to the rotary shaft; and
a third surface that connects the second surface of the arm to the drum bottom,
wherein the height of the hub is greater than the half of the height of the drum, and
wherein a distance from the drum bottom to the second surface of the arm is less than the half of the height of the drum.

4. The laundry treatment apparatus according to claim 1, wherein an end of the arm is spaced apart from the drum body, and
wherein a distance from the hub to the end of the arm is greater than a half of a radius of the drum body.

5. The laundry treatment apparatus according to claim 1, wherein the arm comprises:
an arm base that is disposed at the drum bottom; and
an arm body that has a first end coupled to the hub and a second end coupled to the arm base,
wherein the first fastening unit penetrates the arm base and the drum bottom, and an end of the first fastening unit is located between the arm body and the arm base, and
wherein the second fastening unit penetrates the shaft-fixing unit and the drum bottom.

6. The laundry treatment apparatus according to claim 5, wherein
the arm base protrudes from the drum bottom toward the drum opening,
wherein the arm body is coupled to the arm base by the second fastening unit, and
wherein an end of the arm base is spaced apart from the circumferential surface of the drum body.

7. The laundry treatment apparatus according to claim 6, wherein the arm base and the drum bottom are each made of a first material, and
wherein the arm body is made of a second material that is different from the first material.

8. The laundry treatment apparatus according to claim 7, wherein the arm base includes a bent portion that extends from the drum bottom toward the drum opening.

9. The laundry treatment apparatus according to claim 6, wherein the arm comprises a first arm, a second arm, and a third arm that are arranged about the hub and that are spaced apart from each other by 120 degrees.

10. The laundry treatment apparatus according to claim 9, wherein inner ends of the first, second, and third arms are connected to each other, the inner ends surrounding a circumferential surface of the hub.

11. The laundry treatment apparatus according to claim 1, wherein the shaft-fixing unit comprises:
a body located outside of the drum bottom, the rotary shaft being coupled to the body; and
a fixing arm that extends from the body toward a circumferential surface of the drum bottom and that is located at a position corresponding to the arm, and
wherein the first fastening unit is coupled to the fixing arm through the drum bottom and located in a laundry storage space defined by the drum, the first fastening unit being covered by the arm without exposure to the laundry storage space.

12. The laundry treatment apparatus according to claim 11, wherein the arm comprises:
an arm base located at the drum bottom; and
an arm body having a first end coupled to the hub and a second end coupled to the arm base,
wherein the first fastening unit is coupled to the fixing arm through the arm base, and
wherein the first fastening unit is covered by the arm body without exposure to the laundry storage space.

13. The laundry treatment apparatus according to claim 12, wherein the second fastening unit is inserted into the drum from an outside of the drum bottom and coupled to the arm body through the fixing arm and the drum bottom.

14. The laundry treatment apparatus according to claim 13, further comprising a third fastening unit that is inserted into the drum from the outside of the drum bottom and that is coupled to the hub through the drum bottom.

15. The laundry treatment apparatus according to claim 1, further comprising:
a chamber defined at an inside of the hub;
an introduction hole that is defined at the hub, that allows communication between the chamber and an inside of the drum, and that allows entrance of water from the inside of the drum into the chamber;
a filtering hole defined at a bottom surface of the hub that faces the chamber; and
a drum through-hole defined at the drum bottom and located vertically below the filtering hole.

16. The laundry treatment apparatus according to claim 15, further comprising a chamber cover that is located vertically above the chamber,
wherein the introduction hole is defined between a lower end of the chamber cover and an upper end of the chamber.

17. The laundry treatment apparatus according to claim 16, wherein a distance from the drum bottom to a top surface of the chamber cover is greater than a half of a height of the drum from the drum bottom.

18. The laundry treatment apparatus according to claim 16, wherein the chamber cover protrudes further toward the drum opening than the arm.

19. The laundry treatment apparatus according to claim 15, wherein the filtering hole comprises a plurality of filtering holes that communicate with the drum through-hole.

20. The laundry treatment apparatus according to claim 1, wherein the arm surrounds at least a portion of a circumferential surface of the hub.

* * * * *